(12) United States Patent
Berg et al.

(10) Patent No.: US 6,522,617 B1
(45) Date of Patent: Feb. 18, 2003

(54) OPTICAL HEAD WITH MONOLITHIC LAYER FOR OPTICAL STORAGE

(75) Inventors: John Berg, Holliston, MA (US); John Ritter, Holliston, MA (US); David Kindler, Holliston, MA (US); Lori Duncan, Holliston, MA (US)

(73) Assignee: Terastor Corporation, San Jose, CA (US)

(*) Notice: Subject to any disclaimer, the term of this patent is extended or adjusted under 35 U.S.C. 154(b) by 0 days.

(21) Appl. No.: 09/374,446

(22) Filed: Aug. 13, 1999

Related U.S. Application Data
(60) Provisional application No. 60/110,948, filed on Dec. 4, 1998.

(51) Int. Cl.$^7$ .................................................. G11B 7/00
(52) U.S. Cl. ............................... 369/112.01; 369/44.12; 369/44.23
(58) Field of Search .................... 369/44.11, 44.12, 369/44.14, 44.23, 112.01, 112.08, 112.13, 112.2, 112.23, 112.24, 112.26

(56) References Cited

U.S. PATENT DOCUMENTS

| | | |
|---|---|---|
| 5,004,307 A | 4/1991 | Kino et al. |
| 5,121,256 A | 6/1992 | Corle et al. |
| 5,125,750 A | 6/1992 | Corle et al. |
| 5,729,393 A | 3/1998 | Lee et al. |
| 5,831,797 A | 11/1998 | Schaenzer et al. |
| 5,881,042 A | 3/1999 | Knight |
| 6,061,322 A | * 5/2000 | Jain et al. ................. 369/44.14 |

FOREIGN PATENT DOCUMENTS

EP   WO 97/39446   10/1997

OTHER PUBLICATIONS

"High–numerical aperture lens systems for optical storage", by S.M. Mansfield, et al., *Optics Letters*, Feb. 15, 1993, vol. 18, No. 4.

"High Density Optical Recording Using a Solid Immersion Lens", by Isao Ichimura et al., G.L. Report No. 5371, Nov. 1995.

\* cited by examiner

*Primary Examiner*—Muhammad Edun
(74) *Attorney, Agent, or Firm*—Fish & Richardson P.C.

(57) ABSTRACT

Optical heads having a monolithic layer for interfacing storage media and methods for manufacturing such heads. In one embodiment, the substrate has first and second surfaces to define a through hole which forms an optical path and a lens with a spherical surface and a flat surface opposing the spherical surface is disposed in the optical path in the through hole. The flat surface is coplanar with a flat portion of the second surface. The optical head also includes a transparent layer contiguously formed over both the flat surface of the lens and the second surface of the substrate to form a monolithic layer. The refractive index of the additional layer may match that of the lens. In addition, the additional layer may have a material hardness greater than that of the lens to protect the lens and to reduce wear.

30 Claims, 6 Drawing Sheets

*(Optional)*

OPTICAL HEAD WITH MONOLITHIC LAYER FOR OPTICAL STORAGE

This application claims the benefit of U.S. Provisional Application No. 60/110,948, filed on Dec. 4, 1998.

BACKGROUND

The present disclosure generally relates to substrate processing, structure and fabrication of an optical head for optical storage.

An optical storage system uses an optical head to couple optical energy to and from a storage medium for retrieving or recording data. The optical head may use one or more lenses to tightly focus an optical beam so that the beam projects a small spot on the storage medium to increase the areal storage density. One embodiment of the optical head uses a lens that has a spherical surface and a flat surface opposing the spherical surface. The lens is engaged to a void in a substrate by, e.g., bonding, so that the flat surface of the lens is substantially in the same plane with a surface of the substrate. The lens and the substrate are generally made of different materials.

Such an optical head may be used in an optical storage system in a near-field configuration where the optical coupling between the optical head and the storage medium is achieved at least in part by evanescent fields and may also include coupling via propagation of light. The flat surface of the lens interfaces with the storage medium to provide the evanescent coupling. The optical head can be positioned over the storage medium by an air gap less than one wavelength via an air bearing.

SUMMARY

The present techniques are in part based on the recognition that the material difference in the lens and the substrate can lead to surface variations due to a number of causes. For example, different materials for the lens and the substrate generally have different stresses of both the compressional and tensile types. This difference in the stresses may cause distortion in the flat surface of the lens or areas of the substrate adjacent to the lens. This distortion may be further exacerbated by environmental changes in the system such as the operating temperature since the lens and the substrate may have different thermal expansion coefficients. In addition, because of the difference in the mechanical properties such as hardness and elastic constants of the different materials, the materials can respond differently to machining processes such as lapping during manufacturing of the head. This may also result in surface variations on the substrate.

Surface variation on the substrate is undesirable because the strength of the optical coupling between the optical head and the storage medium, in the near-field configuration, is a function of the air gap. This is because the optical energy can be at least partly coupled by evanescent fields. Because the surface variation changes the thickness of the air gap, the coupled optical signals also changes accordingly. Such surface variation may exceed a predetermined tolerance limit, e.g., 0.15 micro inches in some near-field optical disk drives so that the variation in the optical signals is unacceptable. In addition, the optical head may include a transparent mesa on the flat surface of the lens. The mesa may be used for placing a coil to produce a desired magnetic field in a magneto-optic drive and to couple optical energy. The surface variation can lead to a variation in the height of the mesa and therefore cause undesired signal variations.

An optical head of the present disclosure includes an additional layer on the substrate that is formed of a material that matches one or more material properties of the lens material. In one embodiment, the substrate has first and second surfaces to define a through hole which forms an optical path and a lens with a spherical surface and a flat surface opposing the spherical surface is disposed in the optical path in the through hole. The flat surface is coplanar with a flat portion of the second surface. The optical head also includes a transparent layer contiguously formed over both the flat surface of the lens and the second surface of the substrate to form a monolithic layer. The refractive index of the additional layer may match that of the lens. In addition, the additional layer may have a material hardness greater than that of the lens to protect the lens and to reduce wear.

Another embodiment of the optical head includes a substrate having first and second surfaces to define a through hole which forms an optical path, a lens positioned in the optical path and partially located within the through hole at the second surface, and an additional layer formed over the second surface of the substrate. The lens has a spherical surface and a flat surface opposing the spherical -surface and is so disposed in the through hole that the flat surface protrudes beyond said second surface. The additional layer has an opening that conforms with a portion of the lens at the second surface, and is coplanar with the flat surface of said lens to form an interfacing surface.

These and other aspects and fabrication of the optical heads will become more apparent in light of the following detailed description, the accompanying drawings, and the appended claims.

DETAILED DESCRIPTION

Figure 1:
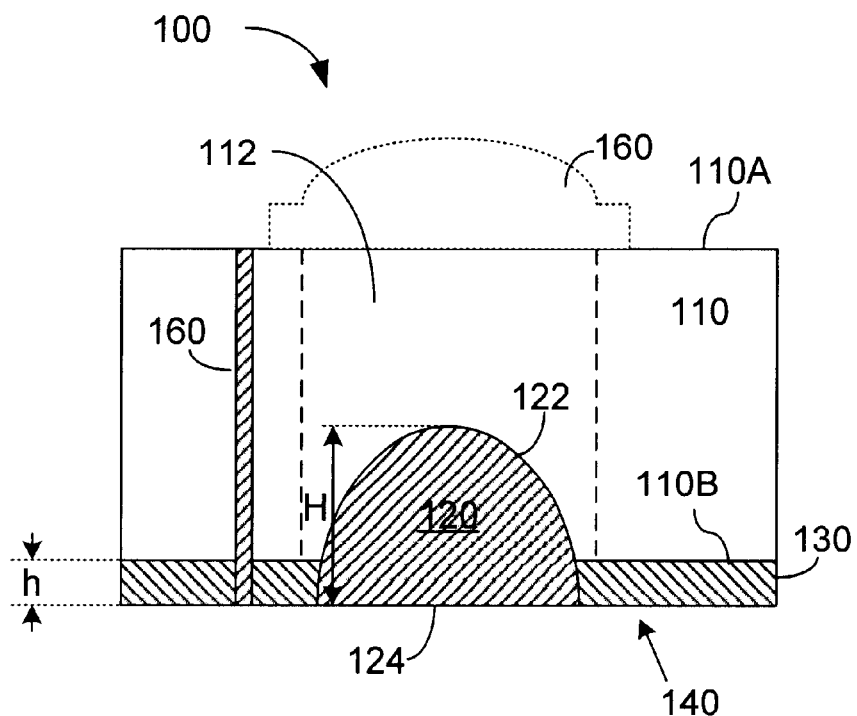
FIG. 1 shows one embodiment of an optical head.

FIG. 1 shows one embodiment 100 of an optical head having a monolithic layer. A substrate 110 forms a base that supports other optical elements in the optical head 100. Different materials such as alumina, cubic zirconia, and glass materials (e.g. Schott LaSF35 glass and Hoya SLAH-79 glass) may be used to form the substrate 110. The substrate 110 includes a first surface 10A on the top and a second surface 110B on the bottom. Surfaces 110A and 110B may be substantially parallel to each other. A through hole 112 is formed in the center of the substrate 110 to define a clear optical path between the surfaces 110A and 110B.

A solid immersion lens (SIL) 120 is disposed in the hole 112 at the second surface. 110B. The SIL 120 has a spherical surface 122 and a flat surface 124. The diameter of the spherical surface 122 is smaller than the dimension of the hole 112 so that the SIL 120 can fit within the hole 112. The SIL 120 is positioned in such a way that a portion of the spherical surface 112 is inside the hole 112 and the flat surface 124 protrudes outside the hole 112. The flat surface 124 is substantially parallel to the second surface 110B and is spaced therefrom by a selected distance h.

The SIL 120 may have different configurations. In one implementation, the SIL 120 is a semispherical lens, where the flat surface 124 is spaced from the center of the spherical surface 122 by a spacing H that is the radius of the spherical surface 122. In another implementation, the spacing H is greater than the radius of spherical surface 122 to form a "super-hemispherical" lens. In the latter the spacing H is preferably around r(1+1/n), where r is the radius of the spherical surface 122 and n is the refractive index of the SIL material.

The optical head 100 implements an additional layer 130 formed on the second surface 11B of the substrate 110. The layer 130 includes an opening that conforms to the shape of the SIL 120 near the flat surface 124 and is engaged to side surfaces of the SIL 120 that protrude outside the hole 112. This arrangement in part holds the SIL 120 in its desired position as described above. In addition, side surfaces of the SIL 120 may be attached to inner surfaces of the hole 112 by bonding. The thickness of the layer 130 is substantially equal to the distance h between the flat surface 124 of the SIL 120 and the second surface 110B of the substrate 110 so that the flat surface 124 and the exposed surface of the layer 130 are coplanar to form a flat bottom surface 140. Conducting vias 160 may also be formed through the substrate 110 and the layer 130 to provide an electrical conduit between the surface 140 and the surface 110A. Further, the optical head 100 may include an objective lens 160 over the first surface 110A to focus a beam to the SIL 120.

The material of the layer 130 preferably has the same or similar materials properties such as hardness and stress as the material of the SIL 120 to improve the flatness of the bottom surface 140 during fabrication. In addition, the layer 130 and the SIL 120 may have the same or similar thermal expansion coefficients to reduce stress at their interface areas due to temperature variations and hence to reduce associated surface distortions. When the layer 130 uses the same material as the SIL 120, the bottom surface 140 formed by the SIL 120 and the layer 130 essentially appears to be a monolithic surface. Hence, the optical head 100 is said to have a "monolithic" layer. Some materials suitable for the layer 130 include a diamond-like-carbon material, diamond, hafnium Oxide, boron Nitride, and tantalum pentaoxide. Further, the material for the layer 130 may not necessarily optically transparent since the optical energy is coupled through the flat surface 124 of the SIL 120.

The optical path in the optical head 100 includes the clear path in the hole 112, the spherical surface 122, the body of SIL 120, and the flat surface 124. In operation, the optical head 100 is positioned so that the flat surface 140 interfaces a storage medium such as an optical disk that has a magneto-optic or phase-change storage layer. In the near-field configuration, optical energy can be at least partially coupled between the optical head 100 and the storage medium through the flat surface 124 of the SIL 120 by evanescent fields. This portion of the optical energy is not limited by diffraction and allows an effective numerical aperture of the optical head 100 to be grater than unity.

Figure 2A:
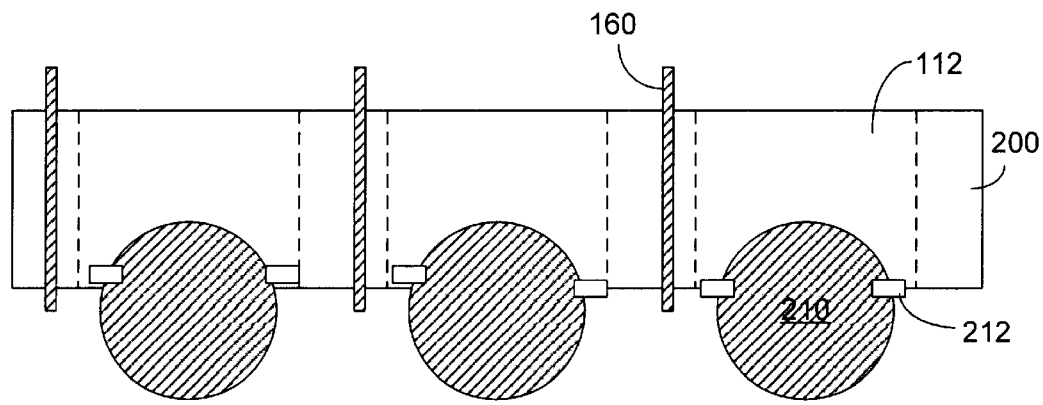
FIGS. 2A through 2E show one embodiment of a fabricating process for making the optical head in FIG. 1.

The optical head 100 may be fabricated in a batch process so that multiple heads can be made from a single substrate. FIGS. 2A through 2E show one embodiment of a batch fabrication process. A substrate 200 is prepared by forming multiple through holes 112 in a desired spatial pattern. Conducting vias 160 may also be formed. Transparent spheres 210 formed of a desired SIL material are then partially placed in the holes 112 at a desired depth equal to (H−h). This process is illustrated in FIG. 2A and may be accomplished by using a positioning tool.

The spheres 210 are then bonded, either permanently or temporarily, to the substrate 200 by using a bonding material 212. For example, a glass material may be used as the bonding material 212 to bond the spheres 210 to the side wall of the hole 112 in the substrate 200 by a glassing process which forms a bonding glass between the materials. Preferably, the coefficient of thermal expansion of the bonding glass is approximately between the coefficients of thermal expansion of the spheres 210 and the substrate 200. When the substrate 200 is made of alumina and the spheres 210 are formed of the Schott LaSF 35 glass, a glass with a high concentration of lead (e.g., Corning 7555) may be used for bonding by glassing at a low temperature.

Figure 2B:
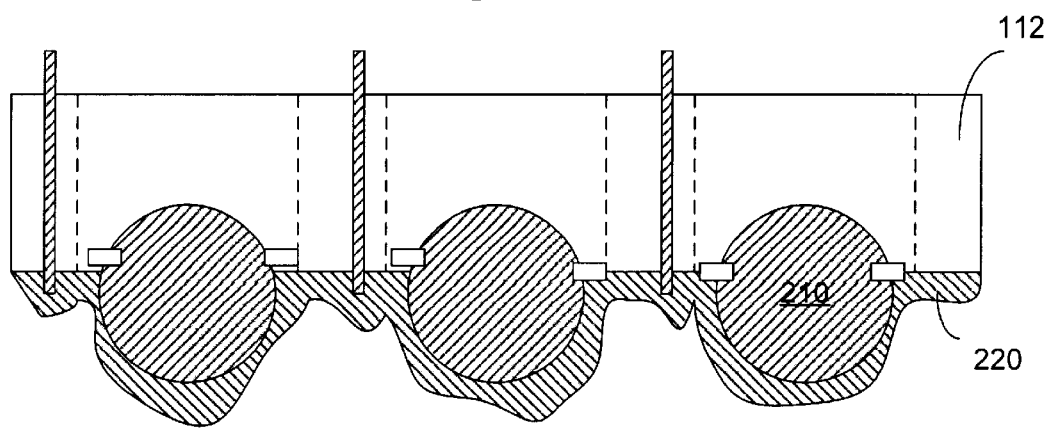

Next, the material for forming the layer 130 is deposited contiguously over the spheres 210 and the substrate 200 to form a layer 220 as illustrated in FIG. 2B. Preferably, the material hardness of the layer 130 approximately matches that of the SIL. The thickness of the deposited layer 220 is at least equal to or greater than the desired amount of protrusion of the flat surface 124 from the surface 110B of the substrate 110, h (FIG. 1), which may be about 1–2 $\mu$m. The deposition may be performed by using a deposition process that deposits the material particles (e.g., atoms or molecules) layer-by-layer over the substrate surface. For example, sputtering at a low temperature may be used, where energetic ions bombard a target to cause the material particles to scatter and to deposit on a substrate. The bias voltage in the sputtering system may be adjusted to reduce the stress in the deposited layer 220. The material for the layer 130 may be the same material as the SIL or may be a different material with similar properties. Other deposition processes such as vapor deposition and ion beam deposition may also be suitable for forming the layer 220.

Figure 2C:
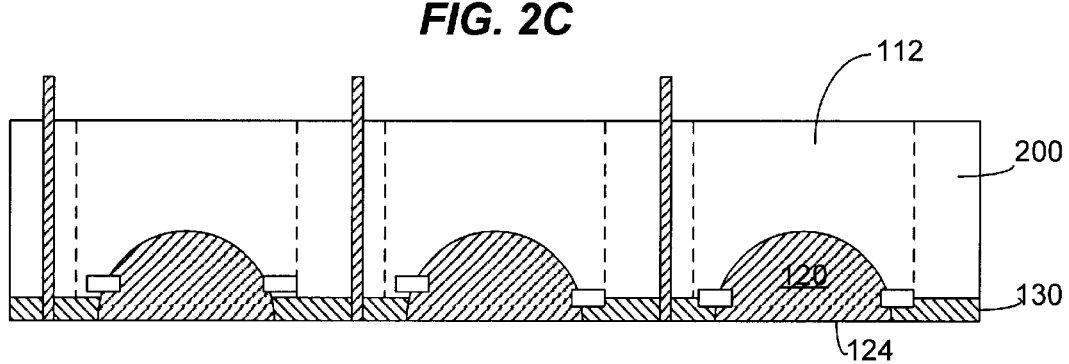

The layer 220 and the protruded portion of the spheres 210 are then lapped to form the flat surface 140 that is spaced from the substrate 200 by the distance h (FIG. 2C). Each sphere 210 now becomes a SIL 120. Because the spheres 210 and the deposited layer 220 have the same or approximately the same material hardness, they respond to the lapping in the same or similar way so that the resultant surface 140 is substantially flat.

Figure 2D:
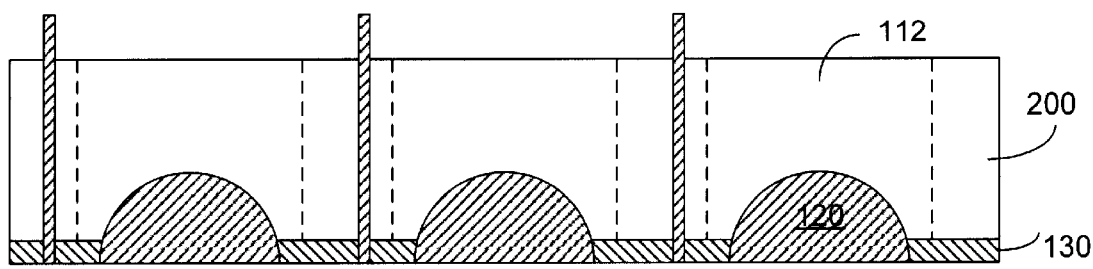
Figure 2E:
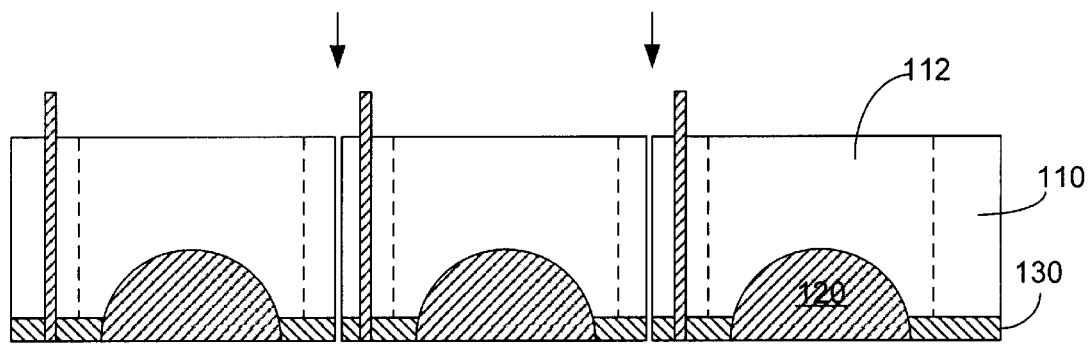

Next, an optional etching process may be performed to remove the bonding material 212 (FIG. 2D). Finally, the above fabricated substrate is sliced into multiple heads as shown in FIG. 2E.

Figure 3:
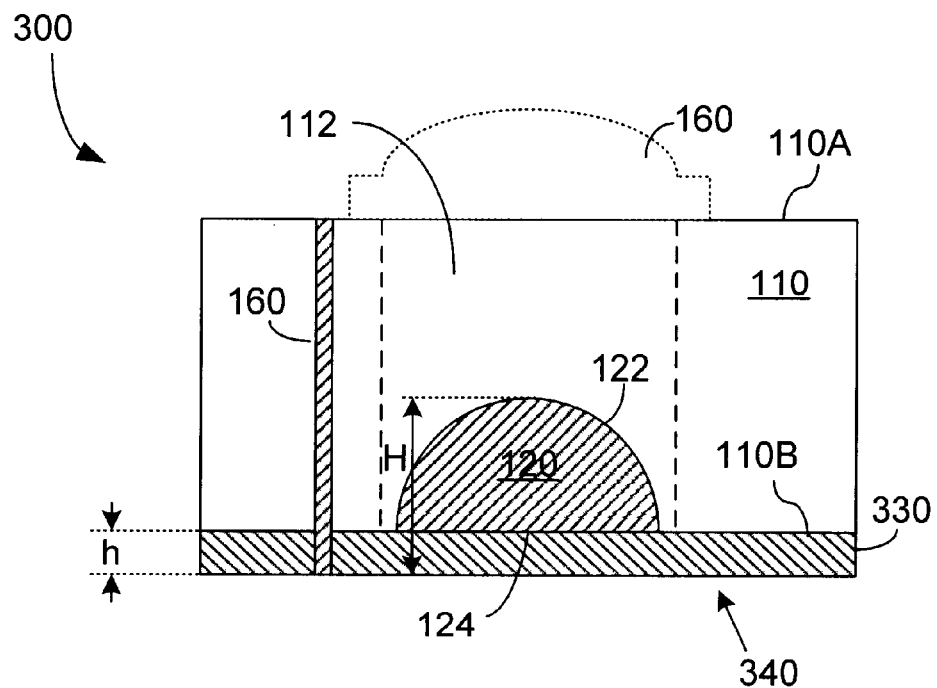
FIG. 3 show another embodiment of an optical head.

FIG. 3 shows an alternative embodiment 300 of an optical head. The flat surface 124 of the SIL 120 is disposed to be coplanar with the surface 110B of the substrate 110. An optically transparent layer 330 is contiguously deposited over the surfaces 124 and 110B to form a monolithic layer 340 that faces the optical disk during operation. The material of the monolithic layer 330 is chosen so that its index of the refraction substantially matches that of the SIL 120. Hence, an optical beam passing through the flat surface of the SIL 120 experiences little optical refraction. In this embodiment, the combined optical effect of both the SIL 120 and the layer 330 is equivalent to the optical effect of the SIL alone in the embodiment 100 of FIG. 1.

The layer 330 may be formed of the same material as the SIL 120. Alternatively, the layer 330 may be formed of a different material whose refractive index is substantially equal to that of the SIL 120. Other material properties of the monolithic layer 330 may be different from those of the SIL 120. For example, the hardness of the monolithic layer 330 may be higher than that of the SIL 120 to protect the SIL 120 and resist wear.

Figure 4A:
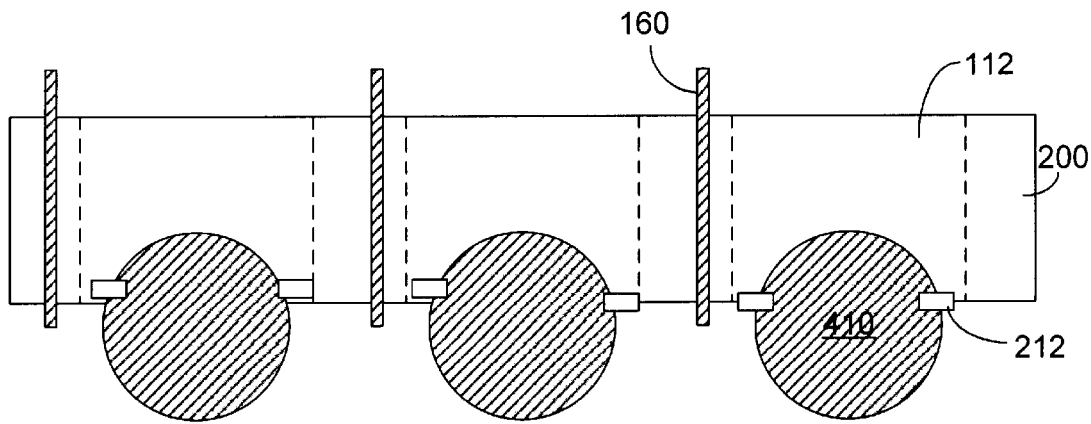
FIGS. 4A through 4D show one fabrication process for making the head of FIG. 3.
Figure 4B:
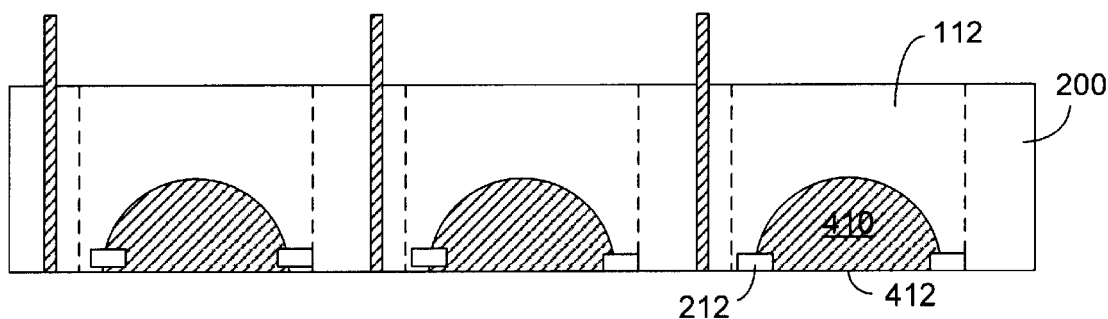
Figure 4C:
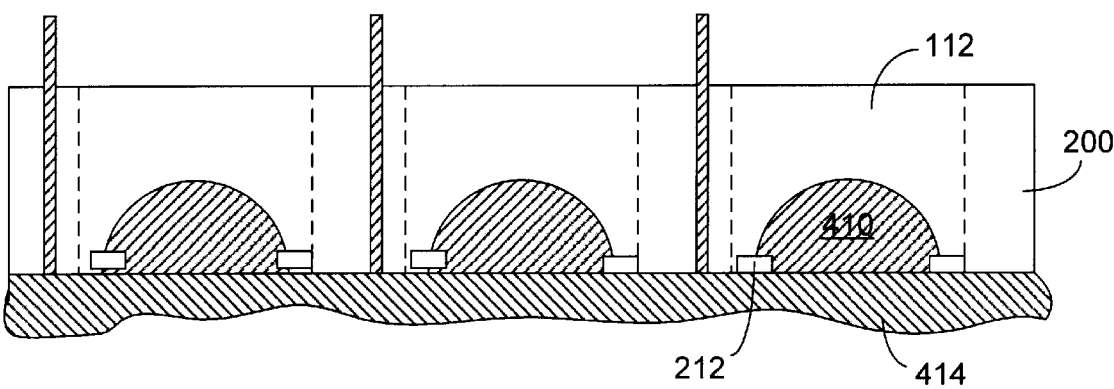
Figure 4D:
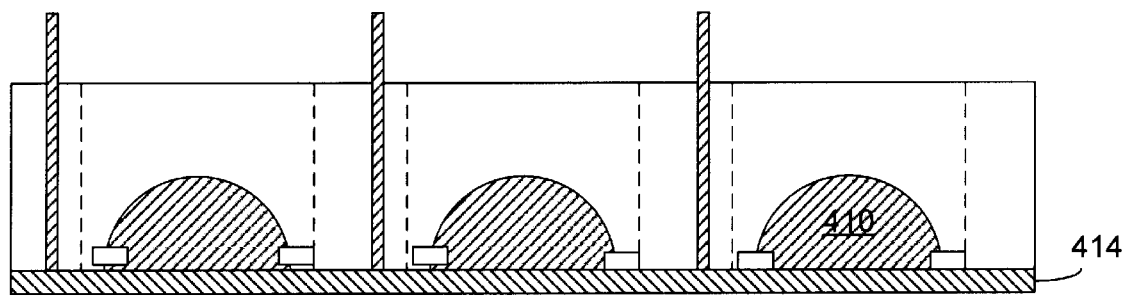

FIGS. 4A through 4D show a batch fabrication process for making multiple optical heads 300 from a substrate. First, an array of through-holes 112 are formed in a substrate 200. Transparent spheres 410 are respectively placed in the through-holes 112 so that a portion of each sphere is within a respective through hole 112 while another portion protrudes outside the hole 112 (FIG. 4A). This is done by using a positioning tool. Then, the spheres 410 are bonded to side walls of respective through-holes 112. Different from making the head 100 of FIG. 1, a lapping process is performed to remove a protruded portion of each sphere prior to deposition of the additional layer. This forms a flat surface 412 in each lapped sphere 410 that is substantially coplanar with the bottom surface of the substrate 200 (FIG. 4B). Next, a transparent layer 414 is placed over both the flat surfaces 412 of lapped spheres 410 and the bottom surface of the substrate 200 to form a contiguous monolithic layer (FIG. 4C). The monolithic layer 414 is then polished to form an optical surface (FIG. 4D). Finally, the above-processed substrate 200 is diced to form multiple optical heads each having a through-hole with a lapped sphere and a monolithic layer.

The above structures and processes provide a number of benefits. For example, flatness of the lapped surface can be controlled within a desired range, such as 0.15 microinch. The variation of the substrate shape can also be reduced. One consequence is that the height of a transparent mesa structure formed on the bottom the optical head 100 or 300 can be ensured within an acceptable range among different optical heads.

Figure 5:
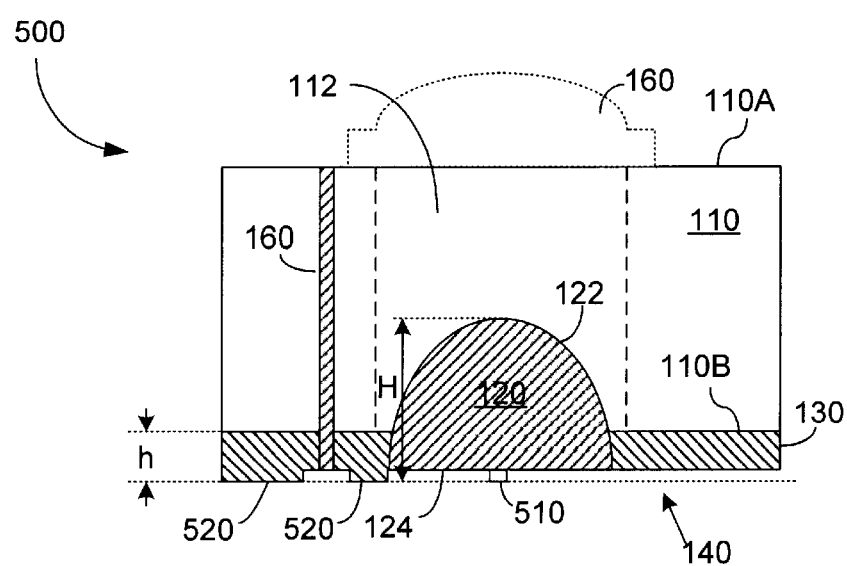
FIGS. 5 and 6 show optical heads having a transparent mesa structure and air bearing surfaces.
Figure 6:
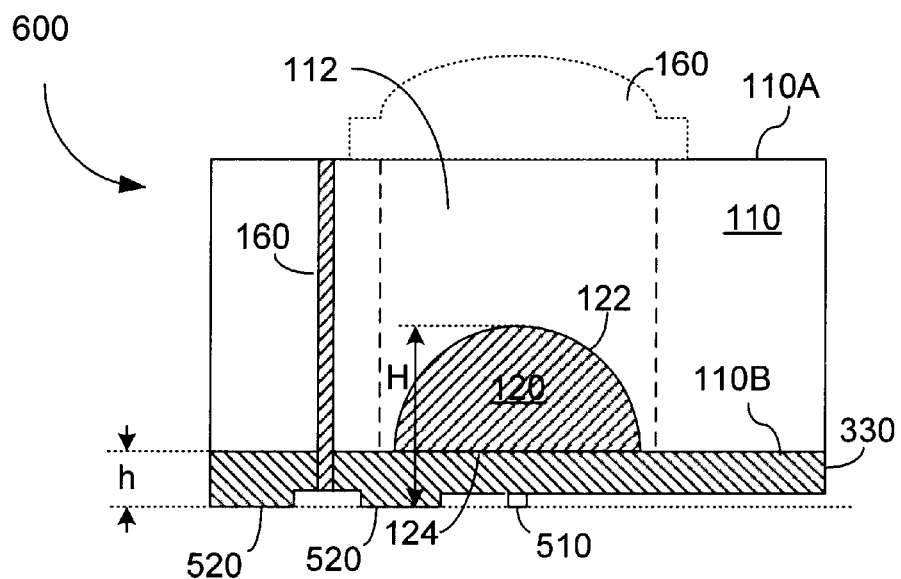

FIGS. 5 and 6 shows modified optical heads 100 of FIG. 1 and 300 of FIG. 3 which include an optically transparent mesa structure 510. In FIG. 5, the mesa 510 is formed on the flat surface 124 of the SIL 120. Hence, the optical coupling is between the exposed mesa surface and the storage medium. A coil may be formed around the mesa 150 to produce a desired magnetic field for magneto-optic recording. Certain portions of the exposed surface of the layer 130 may be removed, e.g., by ion milling, to form air bearing surfaces 520 so that the head 500 can fly over a spinning optical disk. The air bearing surfaces 520 and the exposed mesa surface of the mesa 510 may be substantially in the same plane. The optical head 600 is similarly structured to have the mesa 510 and the air bearing surfaces 520 formed over the layer 330.

Figure 7:
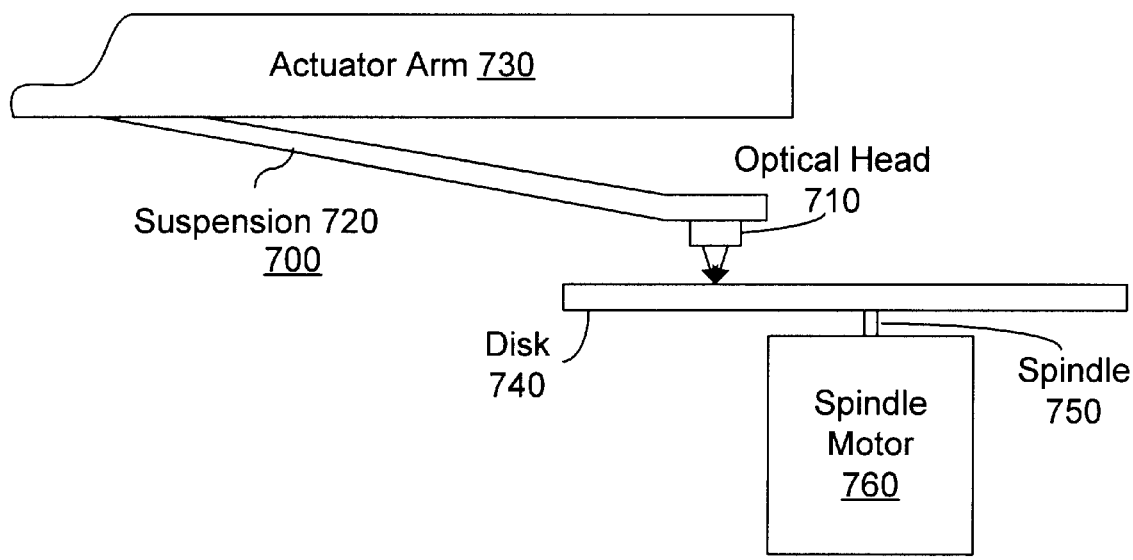
FIG. 7 shows a portion of an optical disk drive using the optical head shown in any of the configurations of FIGS. 1, 3, 5, and 6.

FIG. 7 shows a portion of an optical disk drive 700 using the optical head 710 to couple optical energy to and from an optical disk 740 for retrieving data or recording data. The optical head 710 may be configured according to the embodiments shown in FIGS. 1, 3, 5, and 6. The optical disk 740 includes one or more storage layers. The optical head 710 is engaged to a suspension arm 720 which is further attached to an actuator arm 730. The optical head 710 floats over the spinning disk 740 by action of the air bearing. The actuator arm 730 is movable to place the optical head 710 at a desired position over the disk 740. The disk 740 is held by a medium holder, a spindle 750. A spindle motor 760 drives the spindle 750 to rotate the disk 740.

Although the above description is limited to specific embodiments various modifications and enhancements may be made without departing from the following claims.

What is claimed is:

1. An optical head for coupling optical energy in an optical data storage system, comprising:
    a substrate having at least first and second surfaces that define a through-hole to form an optical path, said second surface having at least one flat portion;
    a lens having a spherical surface and a flat surface opposing said spherical surface, said lens disposed in said optical path in said through-hole to have said flat surface coplanar with said flat portion of said second surface; and
    a transparent layer contiguously formed over both said flat surface of said lens and said second surface of said substrate to form a monolithic layer.

2. An optical head as in claim 1, wherein said transparent layer has a refractive index substantially equal to a refractive index of said lens.

3. An optical head as in claim 1, wherein said transparent layer has a material hardness that is greater than a material hardness of said lens.

4. An optical head as in claim 1, wherein said transparent layer is formed of a same material as said lens.

5. An optical head as in claim 1, further comprising a transparent mesa structure that is formed on said transparent layer in said optical path.

6. An optical head as in claim 1, further comprising an objective lens positioned in said optical path over said first surface of said substrate.

7. An optical head as in claim 1, wherein said lens is a solid immersion lens.

8. An optical disk drive, comprising an optical head to couple optical energy, a holding device to hold an optical disk, and an actuator to place said optical head over the optical disk, wherein said optical head includes:
    a substrate having first and second surfaces that define a through-hole to form an optical path, said second surfaces having at least a flat portion;
    a lens having a spherical surface and a flat surface opposing said spherical surface, said lens disposed in said optical path in said through-hole to have said flat surface coplanar with said flat portion of said second surface; and
    a transparent layer contiguously formed over both said flat surface of said lens and said second surface of said substrate to form a monolithic layer that couples said optical energy between said lens and the optical disk.

9. An optical disk drive as in claim 8, wherein said transparent layer has a refractive index substantially equal to a refractive index of said lens.

10. An optical disk drive as in claim 8, wherein said transparent layer has a material hardness that is greater than a material hardness of said lens.

11. An optical disk drive as in claim 8, wherein said transparent layer is formed of a same material as said lens.

12. An optical disk drive as in claim 8, further comprising a transparent mesa structure that is formed on said transparent layer in said optical path.

13. An optical disk drive as in claim 8, further comprising an objective lens positioned in said optical path over said first surface of said substrate.

14. An optical disk drive as in claim 8, wherein said lens is a solid immersion lens.

15. An optical disk drive as in claim 8, wherein said optical head is operable to couple said optical energy by evanescent fields when said monolithic layer is spaced from the disk by less than one wavelength of said optical energy.

16. A method for fabricating an optical head, comprising:
    forming a plurality of spaced through-holes each having side walls in a substrate having a first surface and a second surface opposing the first surface;
    respectively placing a plurality of transparent spheres in the through-holes so that a portion of each sphere is within a respective through-hole while another portion protrudes outside the second surface;

bonding the spheres to side walls of respective through-holes;

removing a protruded portion of each sphere by lapping to form a flat surface coplanar with the second surface of the substrate to form lapped spheres;

depositing a transparent layer over both the flat surfaces of the lapped spheres and the second surface of the substrate to form a contiguous monolithic layer;

polishing the monolithic layer to form an optical surface; and dicing the substrate to form a plurality of optical heads each having a through-hole with a lapped sphere and a monolithic layer.

17. A method as in claim 16, wherein the spheres are bonded to the side walls of respective through-holes by a glassing process.

18. A method as in claim 16, wherein the transparent layer is deposited by a sputtering process.

19. A method as in claim 16, wherein the transparent layer is formed of a same material as the spheres.

20. A method as in claim 16, wherein the transparent layer is formed of a material having a refractive index that substantially matches a refractive index of the spheres.

21. A method as in claim 20, wherein the transparent layer has a material hardness greater than a material hardness of the spheres.

22. A method as in claim 16, further comprising placing an objective lens on the first surface of the substrate over each through-hole so that the objective lens and the respective lapped sphere form a lens system to focus an optical beam.

23. A method as in claim 16, further comprising forming a transparent mesa on the monolithic layer over a respective lapped sphere.

24. An optical head for coupling optical energy in an optical data storage system, comprising:

a substrate having first and second surfaces to define a through-hole which forms an optical path;

a lens configured to have a spherical surface and a flat surface opposing said spherical surface and disposed in said optical path in said through-hole to have said flat surface protrude beyond said second surface; and an additional layer formed over said second surface of said substrate and configured to have an opening that conforms with a portion of said lens at said second surface, said additional layer being coplanar with said flat surface of said lens to form an interfacing surface that faces an optical disk.

25. An optical head as in claim 24, wherein said additional layer has a material hardness substantially equal to a material hardness of said lens.

26. An optical head as in claim 25, wherein said additional layer is formed of a same material as said lens.

27. An optical head as in claim 24, further comprising a transparent mesa structure formed on said flat surface of said lens for coupling optical energy.

28. A method for fabricating an optical head, comprising:

forming a plurality of through-holes spaced in a substrate having a first surface and a second surface opposing the first surface;

respectively placing a plurality of transparent spheres in the through-holes so that a portion of each sphere is within a respective through-hole while another portion protrudes outside the second surface;

bonding the spheres to side walls of respective through-holes;

depositing an additional layer over both the protruded portions of the spheres and the second surface of the substrate;

removing protruded portions of the spheres and a portion of the additional layer by lapping at a level from the second surface at a desired distance to form a flat surface that is formed in part by lapped flat surfaces of the spheres and in part by a lapped flat surface of the additional layer; and dicing the substrate to form a plurality of optical heads each having a through-hole with a lapped sphere that has a lapped flat surface coplanar with the lapped surface of the additional layer.

29. An optical disk drive, comprising an optical head to couple optical energy, a holding device to hold an optical disk, and an actuator to place said optical head over the optical disk, wherein said optical head includes:

a substrate having first and second surfaces to define a through-hole which forms an optical path;

a lens configured to have a spherical surface and a flat surface opposing said spherical surface and disposed in said optical path in said through-hole to have said flat surface protrude beyond said second surface; and an additional layer formed over said second surface of said substrate and configured to have an opening that conforms with a portion of said lens at said second surface, said additional layer being coplanar with said flat surface of said lens to form an interfacing surface that faces an optical disk.

30. An optical disk drive as in claim 29, wherein said additional layer has a material hardness substantially equal to a material hardness of said lens.

* * * * *